United States Patent
Redoutey et al.

(10) Patent No.: US 9,037,801 B2
(45) Date of Patent: May 19, 2015

(54) METHOD AND SYSTEM OF STORING AND RETRIEVING DATA

(71) Applicant: AMADEUS S.A.S., Sophia Antipolis (FR)

(72) Inventors: Jean-Charles Redoutey, Sophia Antipolis (FR); Joel Singer, Sophia Antipolis (FR); Florent Balard, Sophia Antipolis (FR); Florian Prud'homme, Sophia Antipolis (FR); Romain Bouteloup, Sophia Antipolis (FR); Colin Pitrat, Sophia Antipolis (FR)

(73) Assignee: Amadeus S.A.S., Biot (FR)

( * ) Notice: Subject to any disclaimer, the term of this patent is extended or adjusted under 35 U.S.C. 154(b) by 258 days.

(21) Appl. No.: 13/628,517

(22) Filed: Sep. 27, 2012

(65) Prior Publication Data

US 2014/0089588 A1    Mar. 27, 2014

(51) Int. Cl.
*G06F 12/00* (2006.01)
*G06F 17/30* (2006.01)

(52) U.S. Cl.
CPC .................................. *G06F 17/3048* (2013.01)

(58) Field of Classification Search
CPC .................................................. G06F 17/3048
USPC ............... 711/118, 120, 122; 3/118, 120, 122
See application file for complete search history.

(56) References Cited

U.S. PATENT DOCUMENTS

| | | | | |
|---|---|---|---|---|
| 6,067,550 | A * | 5/2000 | Lomet | 1/1 |
| 6,256,710 | B1 * | 7/2001 | Yazdy et al. | 711/133 |
| 6,609,126 | B1 | 8/2003 | Smith et al. | |
| 7,434,000 | B1 * | 10/2008 | Barreh et al. | 711/118 |
| 7,711,657 | B1 * | 5/2010 | Huberman et al. | 705/400 |
| 2009/0307275 | A1 * | 12/2009 | Miyashita et al. | 707/202 |
| 2010/0180208 | A1 * | 7/2010 | Kasten et al. | 715/745 |
| 2011/0161540 | A1 * | 6/2011 | Chang et al. | 710/200 |

OTHER PUBLICATIONS

European Patent Office, Search Report issued in European Application No. 12368027.4 dated Feb. 27, 2013.

* cited by examiner

*Primary Examiner* — Gurtej Bansal
(74) *Attorney, Agent, or Firm* — Wood, Herron & Evans LLP (57) ABSTRACT

Method and system of storing data by a software application. Each read query of a data storage system by a software application is first solely issued to a plurality of cache nodes, which returns the queried data if available. If not available, the software application receives a miss that triggers a fetch of the queried data from one or more database systems on a first dedicated interface. Upon having retrieved the queried data, the software application adds the queried data to at least one cache node on a second dedicated. Each writing of the one or more database systems by the software application is also concurrently performed in the at least one cache node. Hence, population of the at least one cache node is quickly done at each missed read query of the at least one cache node and at each write query of the data storage system.

25 Claims, 5 Drawing Sheets

METHOD AND SYSTEM OF STORING AND RETRIEVING DATA

FIELD OF THE INVENTION

The present invention relates generally to data management systems of the type used by large providers of goods and services to keep track of their overall product offering and level of availability, and more particularly to a system that allows a high level of inquiries issued by remote-users of the data storage to be responded without or within a very short delay, while not impacting the completion of the transactions that constantly update content as a result of the administration of the data storage.

BACKGROUND OF THE INVENTION

In an all interconnected world all large providers of goods and services have now set up large database systems holding the characteristics, specifications and costs of their products and service offerings. Operated under the control of a database management system (DBMS) contents are made accessible, simultaneously, to many online customers possibly from all over the world. Online customers are thus offered the opportunity to query the database and complete commercial transactions through the use of specific online software applications that let them book and buy various products and services.

In the airline industry, examples of such very-large databases are the ones that hold inventory of airline companies. Such databases are used to keep track in real-time of the actual seat capacity, the current state of reservations along with the configurations of the fleet of flights operated by a given airline.

More precisely, an airline's inventory usually contains all flights with their available seats and is generally divided into service classes (e.g. First, business or Economy class) and many booking classes, for which different prices and booking conditions apply. One of the core functions of the inventory management is the inventory control. Inventory control steers how many seats are available in the different booking classes for instance by opening and closing individual booking classes for sale. In combination with the fares and booking conditions stored in the Fare Quote System the price for each sold seat is determined. In most cases inventory control has an interface to an airline's Revenue Management System to support a permanent optimization of the offered booking classes in response to changes in demand. Users access an airline's inventory through an availability application having a display and graphical user interface. It contains all offered flights for a particular city-pair with their available seats in the different booking classes.

Airline inventory databases are usually managed by airlines. Airline inventory databases can also be set up by companies that provide travel services to many actors of the travel industry including the airlines, the traditional travel agencies and all sorts of other online travel service providers too. Such a company is for example AMADEUS, a European travel service provider with headquarters in Madrid, Spain. Some inventories are directly run by airlines and are interfaced with a global distribution systems (GDS) or a central reservation system (CRS).

In this environment, the utilization of these databases is characterized by a level of interrogations or read queries which has dramatically increased over the years. Indeed, the look-to-book ratio of transactions that databases must handle is becoming very high. Hence, travel service providers must put in place the necessary computerized resources to cope with that situation so that an ever growing number of online customers can effectively query the databases, and still obtain a quick response, while updating of the database can go on simultaneously as a result of the completion of booking and selling of seats to air travelers in the case of airlines.

Large database systems provided by a few specialized companies like Oracle, a company headquartered in Redwood Shores, Calif., United States that specializes in developing database management systems, are available and largely used for implementing those databases. Alone, standard DBMS cannot however cope with the level of requirements raised by the need that large service providers of goods and services may have to serve simultaneously tens of thousands of potential customers. To achieve this objective, the database must somehow be shielded from the myriad of user queries it would otherwise directly receive.

Many solutions for caching database contents have thus been developed. Cache may be an application cache, located at application tier, which basically reuses pieces of data previously fetched from the database by the application. This immediately raises the issue of the data quality then delivered in response to further user interrogations since database contents may have been updated in the mean time. This turns out to be truly challenging for some applications where databases are constantly updated and require a high quality of data. This is for instance the case of applications related to airline's inventory where the freshness of the data directly impacts the possibility to sell seats and the price offered to customers.

Thus, unless the quality of data delivered by this type of cache is not of prime importance, and may be considered as being more informative than anything else, this type of application caches requires the implementation of sophisticated mechanisms, between database et cache, that allow invalidation and/or replacement of the previously fetched pieces of data when updated in database thus keeping application cache and database contents indeed consistent. Often, cache is inserted in the path between the database and the application so that it is always queried first by the application. If the queried data is not present in cache, then it is fetched from the database and brought into the cache before being delivered to the application. All these solutions have in common to require that cache and database be tightly coupled and need to be aware of each other. As a consequence, these solutions are not easily scalable when service provider must deploy more computer resources to cope with an increase of traffic and serve more customers while maintaining system performances.

A specific solution that allows a rather good scalability brings some independence between cache and database is however shown in U.S. Pat. No. 6,609,126 which describes a "System and method for routing database requests to a database and a cache". In the disclosed solution database and cache are becoming somehow independent by being driven separately, solely under the control of the application. However, the cache is only used to answer read queries while updates are performed only in database by application. Hence, to reflect the changes brought to the database into the caches the above patent describes a replication component contained in database that updates the caches.

All above caching solutions bring an important additional workload to the database while caches and databases are not however guaranteed to be always coherent and databases must be aware of the various caches. This requires that specific operations be performed in databases when adding a new cache thus preventing scalability to be simply achievable. As mentioned, U.S. Pat. No. 6,609,126 requires that the database management system imbeds a foreign component. This is not really compatible with the utilization of a standard DBMS.

It is thus an object of the invention to describe a computerized data system equipped with a database that allows a high traffic and a high scalability while providing user with a suitable data quality.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The foregoing and other problems are overcome, and other advantages are realized, in accordance with the embodiments of this invention.

In a first aspect thereof this invention provides a method of storing data in a data storage system and retrieving data from the data storage system, comprising a software application, one or more database systems and a plurality of cache nodes, the software application being configured to receive user requests requiring at least one reading of data or one writing of data, the software application being further configured to send read queries and write queries to the data storage system for processing the user requests, the method being characterized in that the software application interfaces independently the one or more database systems and the plurality of cache nodes and in that the method comprises the following steps performed by the software application with at least one data processor:

upon reception of a user request requiring at least a reading of data, the software application sends a read query solely to at the plurality of cache nodes. Preferably, if the software application receives a queried data (i.e., a data that is retrieved) from at least one cache node in response to the read query, then it uses the queried data to process the user request. Preferably, if the software application receives a miss from all cache nodes in response to the read query, meaning thereby that the data has not been found in the cache node, then it fetches the one or more database systems; if the queried data is present in the database system, upon having retrieved the queried data from the one or more database systems, the software application uses the queried data to process the user request and sends the queried data to at least one cache node and an instruction to add the queried data to the at least one cache node.

According to a preferred embodiment, upon reception of a user request requiring at least a writing of data, the software application sends an instruction for writing the one or more database systems and also sends an instruction for concurrently writing the plurality of cache nodes; thereby, populating the plurality of cache nodes at each missed read query, i.e. at each read query for which the queried data is not found in all cache nodes, and at each write query of the data storage system. Each data is thus stored identically in at least one cache node of the plurality of cache nodes and in the one or more database systems, ensuring thereby that the database systems and the plurality of cache nodes are always fully synchronized.

Thus, the invention allows having the database completely independent from the plurality of cache comprising the plurality of cache nodes contrary to known solutions involving a replication component integrated in the database to perform the update of the cache, the database and cache being thereby not fully independent which limits the scalability of the entire storage system and requires specific database.

The computerized data system equipped with a database and a cache that are completely independent and unaware of each other thus permits an unbounded scalability of the data system by simply bringing more computer and storage capacity when necessary to cope with an increase of traffic.

In addition, high scalability can be achieved while limiting the cost of the equipment. In particular, the invention can be implemented with standard databases and DBMS. The invention also allows reducing the cost of the maintenance. In particular, the increasing of the storage resources does not need any operation on the database.

Since, the software application is in charge of updating the data in the database and of populating the caches either through reflecting a writing of the database or through adding a queried data that is present in the database but not yet present in the cache, end-users can be provided with high quality data i.e., the most up-to-date data. In addition, caches are rapidly populated which allows increasing the throughput right upon the addition of a new cache node to the system.

In addition, the invention allows providing user with precise and customer tailored replies.

According to a non limitative embodiment, a write query comprises at least one of: addition, update and deletion of data in the database systems In a further aspect thereof this invention provides a computer-program product or a computer-readable medium that contains software program instructions, where execution of the software program instructions by at least one data processor results in performance of operations that comprise execution of the above method.

The exemplary embodiments also encompass a method of storing data in a data storage system and retrieving data from the data storage system, comprising a software application, one or more database systems and a plurality of cache nodes, the software application being configured to receive user requests requiring at least one reading of data or one writing of data, the software application being further configured to send read queries and write queries to the data storage system for processing the user requests, the method being characterized in that the software application interfaces independently the one or more database systems and the plurality of cache nodes and in that the method comprises the following steps performed by the software application with at least one data processor:

upon reception of a user request requiring at least a reading of data, the software application sends a read query solely to the plurality of cache nodes;
  if the software application receives the queried data (i.e., the data that is retrieved) from at least one cache node, then it uses the queried data to process the user request,
  if the software application receives a miss from all cache nodes, then it fetches the one or more database systems; if the queried data is present in the database system, upon having retrieved the queried data from the one or more database systems, the software application uses the queried data to process the user request and sends to at least one cache node the queried data and an instruction to add the queried data to the at least one cache node; if not found in database, add in cache an information that indicates that the data does not exist
  and wherein each data is stored identically in at least one cache node of the plurality of cache nodes and in the one or more database systems or in a way which guarantees consistency of the addressing of the same data in cache and in database.

Optionally but advantageously, upon reception of a user request requiring at least a writing of data, the software application sends an instruction for writing the one or more database systems and also sends an instruction for concurrently writing the plurality of cache nodes; thereby, populating the plurality of cache nodes at each missed read query and at each write query of the data storage system.

In yet another aspect thereof this invention provides a method of storing data in a data storage system of an airline's Inventory and retrieving data from the data storage system, comprising a software application, one or more database systems and a plurality of cache nodes, the software application being configured to receive user requests requiring at least one of: a reading of data to know an availability regarding at least one flight and a writing of data to modify an availability regarding at least one flight; the software application being further configured to send read queries and write queries to the data storage system for processing the user requests, the method being characterized in that the software application interfaces independently the one or more database systems and the plurality of cache nodes and in that the method comprises the following steps performed by the software application with at least one data processor:
upon reception of a user request requiring at least a reading of data to know an availability regarding at least one flight, the software application sends a read query solely to the plurality of cache nodes;
 if the software application receives the queried data (i.e., the data that is retrieved) from at least one cache node, then it uses the queried data to process the user request,
 if the software application receives a miss from all the cache nodes, then it fetches the one or more database systems; if the queried data is present in the database system, upon having retrieved the queried data from the one or more database systems, the software application uses the queried data to process the user request and sends the queried data to at least one cache node and an instruction to add the queried data to the at least one cache node;
and wherein each data is stored identically in at least one cache node of the plurality of cache nodes and in the one or more database systems.

Optionally but advantageously, the user request requiring at least a writing to modify an availability regarding at least one flight is a user request for at least on of: purchasing a seat, canceling a seat, modifying a seat.

In yet another aspect thereof this invention provides a data storage system comprising one or more database systems, at least one cache node, at least one data processor and a software application, where execution of the software application by the at least one data processor results in performance of operations that comprise execution of any one of the above methods and wherein the one or more database systems and the at least one cache node are configured to be independently driven by the software application.

Advantageously the number of cache nodes and the processing power of the computerized means for running the software application are adapted to meet the aggregated peak traffic generated by all end-users of the software application.

DETAILED DESCRIPTION

Before providing a detailed description of the present invention, some advantageous but non limitative features and steps of the invention are now mentioned. It is first recalled that according to an embodiment, the invention relates to a method of storing data in a data storage system and retrieving data from the data storage system, comprising a software application, one or more database systems and a plurality of cache nodes, the software application being configured to receive user requests requiring at least one reading of data or one writing of data, the software application being further configured to send read queries and write queries to the data storage system for processing the user requests, the method being characterized in that the software application interfaces independently the one or more database systems and the plurality of cache nodes and in that the method comprises the following steps performed by the software application with at least one data processor:
upon reception of a user request requiring at least a reading of data, the software application sends a read query solely to at the plurality of cache nodes. Preferably, if the software application receives a queried data (i.e., a data that is retrieved) from at least one cache node in response to the read query, then it uses the queried data to process the user request. Preferably, if the software application receives a miss from all cache nodes in response to the read query, meaning thereby that the data has not been found in the cache node, then it fetches the one or more database systems; if the queried data is present in the database system, upon having retrieved the queried data from the one or more database systems, the software application uses the queried data to process the user request and sends the queried data to at least one cache node and an instruction to add the queried data to the at least one cache node.

Optionally, the method according to the invention may comprise any one of the following facultative features and steps:

The data model of cache and database may be identical but does not need to be strictly identical though. The only requirement is that they must be consistent so that exact same addressing keys can be derived for accessing cache and database records. The keys must also allow database records to be locked for write operation consistency. Hence, data records are either stored identically in database and in cache, when present, or in a way which guarantees consistency of the addressing of the same data records in cache and in database. For example, cache data model can be adapted versus the database model to expedite the retrieving of data so that access time of the cache is improved while addressing is kept fully consistent between the two entities.

According to a non limitative embodiment, the data model of the cache nodes is the same as the data model of the one or more databases. Each data of each cache node is stored identically in the database system. Each data of the database system is stored identically in each cache node.

The instruction to write the one or more database systems is sent by the software application to the one or more database systems.

The instruction for concurrently writing the plurality of cache nodes is sent by the software application to the plurality of cache nodes One single software application accesses the database system and the cache nodes.

The data storage system comprises one single database system.

The cache comprises cache nodes, comprising each data storage means which are not persistent.

The software application receives a positive acknowledgement on completion of a successful addition of the queried data to the at least one cache node.

If a writing of data occurs while the same queried data are concurrently fetched from the one or more databases then the subsequent addition of the queried data in the at least one cache node is aborted and a negative acknowledgement is returned to the software application; thereby, enabling the software application to use the written data instead.

The following steps are performed upon sending of an instruction for writing the one or more database systems and an instruction for concurrently writing the plurality of cache nodes:

retrieving from the one or more database systems and locking in the one or more database systems a currently stored data on which the writing applies;

processing in software application and writing in the one or more database systems new data to be stored;

writing in software application a cache buffer to temporarily hold said new data to be stored;

forwarding to and setting into the at least one cache node said new data to be stored and committing the transaction to the one or more database systems.

In the present invention a cache node or a cache is different from a cache buffer. The cache buffer stores temporarily the data during the writing. No data is retrieved from the cache buffer in response to a user request. The cache buffer is dedicated to the processing of the writes.

If the commit fails, then the application software sends an instruction to the at least one cache node to delete said new data that has been previously set.

The at least one cache node that contains said new data deletes it from its content. If a plurality of cache nodes contain said new data, then all the cache nodes of said plurality delete it.

The software application decides to which cache node or which cache nodes among the plurality of cache nodes the instruction to add data or the instruction for updating or deleting data is sent.

The decision takes into account a load balancing.

If the queried data is not either present in the one or more database systems or in at least one cache node, then, upon fetching the one or more database systems a miss is returned to the software application instead of the queried data;

the software application sends to at least one cache node a data of absence which is added to the at least one cache node for the corresponding queried data, the data of absence becoming immediately available for all next queries;

thereby, avoiding the software application to have to further fetch the one or more databases in a next attempt to retrieve the missing queried data.

The data user requested by end-users that are not eventually found in database are then stored in cache as "missing data" so that a next interrogation of the cache can return immediately the information that the user requested data is neither present in cache nor in database. This prevents further interrogation of the database from slowing down the database system.

According to one non limitative embodiment, each data is associated with a header to form a record, the header indicating whether the content is missing in the at least one database system. Thus, reading only the header of the record enables knowing whether it is worth fetching the database system.

According to another embodiment, the cache node stores a specific value associated to the data, said specific value indicating that the data is not present in the database.

The software application interfaces independently the one or more database systems on a first dedicated interface, and the plurality of cache nodes on a second dedicated interface.

The data model is chosen in such a way that it is directly map-able between the database and the cache Each set of data is grouped by functional entity and indexed by a key which makes the set of data immediately accessible as a whole thanks to this key both in the database system and in the cache nodes.

The data are grouped by flight-date and are identified by a flight-date key.

The software application is a software application of a travel provider's inventory.

The software application, the database system and the cache nodes are comprised in an inventory of a travel provider.

Typically, the travel provider is an airline.

The user request received at the software application is sent by at least one of: travel agency, online travel agency, on online-customer.

The data model of the cache nodes and the database are consistent so that exact same addressing keys can be derived for accessing cache nodes and database data.

The data are either stored identically in the database and in at least one cache node, when present, or in a way which guarantees consistency of the addressing of the same data in cache and in database Optionally, the data storage system according to the invention may comprise any one of the following facultative features and steps:

The number and storage resource of the cache nodes is adapted to hold the whole database system contents.

Some data of the database system are stored in more than one cache node.

The hit ratio query of the at least one cache node eventually reaches 100% when the whole database system contents has been transferred into the at least one cache node by the software application.

In yet another aspect thereof this invention provides an Inventory of a travel provider comprising the data storage system of the present invention.

The following detailed description of the invention refers to the accompanying drawings. While the description includes exemplary embodiments, other embodiments are possible, and changes may be made to the embodiments described without departing from the spirit and scope of the invention.

Figure 1:
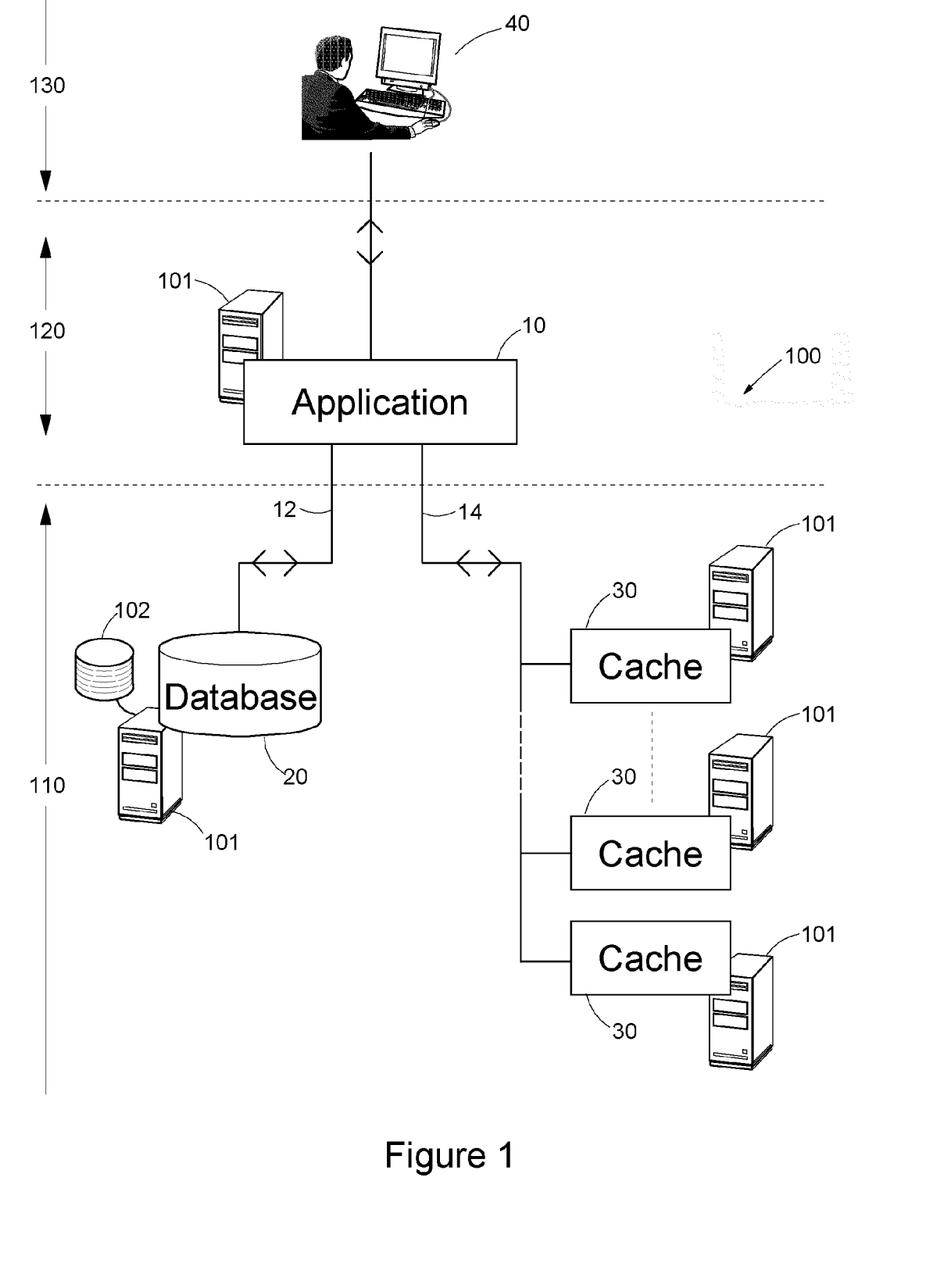
FIG. 1 depicts a data storage system according to the invention.

FIG. 1 describes a data storage system 100 according to the invention in which a software application 10 is interfacing independently, on one hand, a database system 20 and, on the other hand, a cache system also referred to as cache and comprising one or more cache nodes 30.

It is worth noting here that the database cache system of the invention described hereafter are specific mainly because the whole database content may eventually be transferred into a set of cache nodes that operate as a front-end processing layer shielding all the reading traffic that would otherwise reach the database systems 20 thus dramatically improving the performances of the data storage system 100. A sufficient number of cache nodes are then deployed to support the whole traffic and to handle together the whole data base content. Hence, when the system has been up and running for a significant period of time all data entities contained in the back-end database are eventually transferred or present into the set of cache nodes so that there is no longer any cache miss since all read queries are then handled by the cache nodes. Writings of the database are systematically performed in cache and in database so that cache and database contents are always consistent. Even though data storage system hereafter described is thus more a high speed front-end storing and processing system to a database used as a repository of data the term of cache is however used in the following description of the invention.

The data storage system 100 follows the traditional tree-tier architecture often used by data processing systems. The middle tier 120 is the software application 10 tier from where the proprietary software application 10 of the service provider is run. In the example previously used of a GDS this is typically the inventory application of any airline which is aimed at keeping track of all reservations and booking of seats among the airline fleet of flights.

The client tier 130 is comprised of all remotely located users 40 of the application 10. In case of a travel application set up by a service provider like the above airline inventory the end users are typically travel agents in traditional travel agencies. They are as well individuals that use any of the many available travel web sites or online travel agencies from which they can issue travel requests and possibly book, online, air trips.

The lower tier is the storage tier 110 that comprises the database system 20. The invention does not make any assumption on the database system used by the service provider. It is most often based on a standard data base management system (DBMS) commercially available but it can be as well a proprietary database system. Whichever database system is used by the service provider it is implemented from a sufficient amount of hardware and software resources to hold and process all the data of the service provider. In FIG. 1 all hardware resources needed to implement the data storage system 100 are shown as individual computer-like machines globally referred to by numeral reference 101. Persistent, non-volatile, storage is assumed to be available from each individual computer and also as separate data disk 102 when necessary, for example to permanently hold the database contents.

The data storage system of the invention comprises the storage tier 110 and the middle tier 120.

In the present invention, the term 'user request' or 'request' designates a demand coming from a user 40 and that reaches an application 10. The user can be a person such as a traveler or a travel agent or can be a computerized system that sends requests.

In the present invention, the term 'data query' or 'query' designates a demand sent by the application 10 to a cache node 30 and/or to the database system 20. A query can be a read query or a write query.

A read query comprises an instruction to get from at least a cache node or to read a data from the database systems. Typically, the action for obtaining a data from the database systems is designated as a 'read', whereas the action for obtaining a data from a cache node is designated as a "get". A queried data is at least a data that must be get or read for fulfilling, at least in part, a user request.

A write query comprises an instruction to add, to update/set, or to delete a data. Typically, the action for modifying a data from the database systems is designated as an 'update', whereas the action for modifying a data from a cache node is designated as a "set".

Thus, in the following invention, the application 10 receives user requests and sends data queries, these queries being either read queries or write queries.

Whichever system is actually used, the invention assumes that database 20 is the ultimate data repository of the service provider. The database 20 then preferably adheres to the ACID (Atomicity, Consistency, Isolation and Durability) set of properties guaranteeing that database transactions are thus processed reliably in terms of: Atomicity, Consistency, Isolation and Durability.

With respect to database systems previously mentioned and known from the prior art, the software application 10 of the present invention remains connected directly, thus independently, to the database 20 through a dedicated interface 12. Hence, operation of the database system is not affected whatsoever by the one or more cache nodes 30 that have their own dedicated interface 14 with the software application 10. As further discussed in the following description of the invention, it is then up to the software application 10 to only send to the database the mandatory transactions that this latter must necessarily handle, i.e., the ones in which database contents is permanently updated as a result of new bookings being completed and generally whenever status of reservations must be changed because, for example, cancellations have occurred.

Thus there is no connection between any one of the cache nodes 30 and the database system 20. No messages, instructions or data are exchanges between the database system and the cache nodes 30

In data storage system 100 all of the traffic handled by the software application 10 is then supported through the dedicated cache software application 10 interface 14. As shown in FIG. 1 cache is functionally located at storage tier like the database. Interface 14 and the one or more cache nodes 30 are assumed to be able to handle all the traffic of the data storage system 100, whichever throughput is targeted, just by providing and deploying at software application 10 tier 120, and at storage tier 110 for the cache nodes, enough hardware and software resources to meet the expected throughput. Hence, processing more data is simply obtained by adding more computing and storing resources to the existing ones. This way of doing provides a system scalability which is not limited by architectural considerations other than the number of computer platforms that need to be deployed to achieve the targeted throughput, i.e., their cost, power dissipation and floor occupancy.

To allow above scalability to be effective, the data storage system 100 is based on a global key/value data model where contents are consistent in cache and in database so that a same key can be used to retrieve both. The data model is thus chosen in such a way that it is directly map-able in database and in cache. Especially, each set of data is grouped by functional entity and indexed by a common unique key. This makes them immediately accessible as a whole from the unique key both in database and in cache although contents may somehow differ. The only requirements on the data model to operate as explained above are:

the ability, before an update, to lock a superset of the data to be updated in cache;

the possibility to deduce all cache keys impacted by a given update in the database in order to update them.

A typical example taken from the field of the travel industry is as in following table:

| Key in DB | Lock level (in DB) | Key in cache | Cache keys generation |
|---|---|---|---|
| Flight-Date | Flight - Date | Flight - Date | equal to key in DB |
| O&D (*) - Date range | O&D (*) - Date range | O&D - Date | one key per day in the date range |
| Leg () - Date | Flight - Date | Leg () - Date | equal to key in DB |
| Flight - Date | Flight - Date | Leg () - Date | one key per leg (); in the flight |

Where:
(*) O&D = origin & destination
(**) A leg is a part of a flight. For example, a flight can go from Nice (NCE) to New York (NYC) with a stop at Paris (CDG). It has two legs: NCE-CDG and CDG-NYC. (Note that it contains three O&D: NCE-CDG, NCE-NYC and CDG-NYC.)

In the above example the schedule information is stored in a relational database. The "mother" table has a Flight-Date primary key. One of the "child" tables has a Leg-Date primary key. Some writings (updates for instance) are done at flight level, others at leg level. Locking at flight level is used in both cases. This is used to prevent any modification of the flight and also on all legs of the flight. The lock cannot be set at leg-date level because an update of the flight would then update all legs and could lead to concurrent updates.

Therefore, the data model of the database and caches, if not strictly identical, must be consistent so that same indexing keys can be derived for accessing cache and database records while allowing database records to be locked.

The architecture shown in FIG. 1 works with a cache organized as a single layer client side distributed cache which supports the whole throughput and also simplifies significantly the management of the cache data consistency. Having a client side distributed cache means that data distribution among the various cache nodes 30 composing the cache is known and computed on client side at software application 10 tier. As a consequence, all cache nodes 30 are thus fully independent and scalability of the system is indeed potentially unlimited. However, actually getting more processing power by adding new cache nodes 30 in the storage tier is only achievable if a balanced distribution of data within the nodes is also maintained. To obtain that distribution be indeed balanced, data are distributed based on their key properties. For instance, flight oriented data are distributed on the basis of their flight number. Any modification that would trigger a change of the distribution, e.g., because of a change of the number of available cache nodes or of the distribution parameters, is also supported through a graceful redistribution procedure that keeps the whole cache system online and working in nominal conditions while redistribution takes place. To this end a temporary dual-feed to two cache configurations is later described in the following description of the invention.

The data storage system 100 of the invention does not require any type of synchronization mechanism between cache and database. The cache is used by the software application 10 in an explicit way, i.e.: it is up to the software application 10 tier to use either one of the two data sources: database or cache, or both at during the same user request, e.g., when database or cache must be written. The direct consequence of this approach is that database is kept totally unaware of the existence of a cache and is not at all impacted by the presence, or not, of a cache in the data structure of the invention. The opposite is obviously also true: the cache is totally decoupled from the database. Both structures can then fully evolve independently if necessary.

It is worth noting that data writings within the cache are not using an invalidation policy. All writings result in the immediate replacement of the data into the cache. When the whole database contents is eventually mapped into the cache and distributed over all available cache nodes 30, hit ratio reaches 100% even in case a very high level of concurrent writings happens.

Cache data can always be considered as valid and there is no need for extra process to check for it. Indeed, every cache miss triggers the addition of the missing value into the cache from the database. This is done once for all thus ensuring the lowest possible load on the database which is fetched only once per data entity to retrieve. This occurs mostly when cache becomes operational, e.g., after a power-on of the system following an addition of a cache node 30, a failure or the cache node 30, an operation of maintenance etc. The invention assumes there is enough room in the distributed cache nodes 30 to receive the whole database contents.

The absence of data requested by an end-user in the database is also recorded in the cache. If a piece of data requested by an end user can neither be found in cache nor retrieved from the database then an absence of data is recorded into the cache so that next time cache is queried no fetching of the corresponding piece of data will be attempted from the database in order to further limit database load.

The architecture described in FIG. 1 is extensible to any type of data that can be key-value oriented. Also, it is applicable to any process that can be key-value oriented. It is in particular applicable to any of the processes devised to check flight availability.

The following figures describe the operations that are conducted by the software application 10 between database and cache to obtain that cache eventually supports the whole traffic generated by the software application 10 to serve all user requests.

As shown previously the cache part of the system is pretty simple and composed of one or more standalone computers offering a basic remote key/value protocol. Three basic operations on the cache are defined that let software application 10 updates it, populates the cache from the database, and retrieves data from the cache. They are:

Set (key, value): Unconditionally update in cache the value associated with the key Add (key, value): Add the value associated with the key when it is not already present in cache Get (key): Return from cache the value associated with the key.

The invention does not make any assumption on the way they are actually implemented by the software application 10 provided the expected level of performance can be reached. Advantageously, bulk operations are defined which makes possible to send and process several basic operations together.

The main part of the system is on the software application 10 tier to control data distribution over all cache nodes 30. Key/value data are spread among the nodes composing the cache. To obtain that distribution be as much as possible equally spread over all nodes a property of the key is extracted and the corresponding cache node 30 is computed by the formula:

node_number=key_property_as_a_number MODULO the number_of_nodes

Flight oriented data use the property that consecutive flight numbers are usually used for flight having same properties. In this case the flight number is directly used as a base for the distribution.

For flight oriented data based on origin and destination of flight (O&D) a hash value is computed on the sole O&D key.

As already discussed, balancing the data distribution over all available nodes is really key in achieving unlimited scalability.

Figure 2:
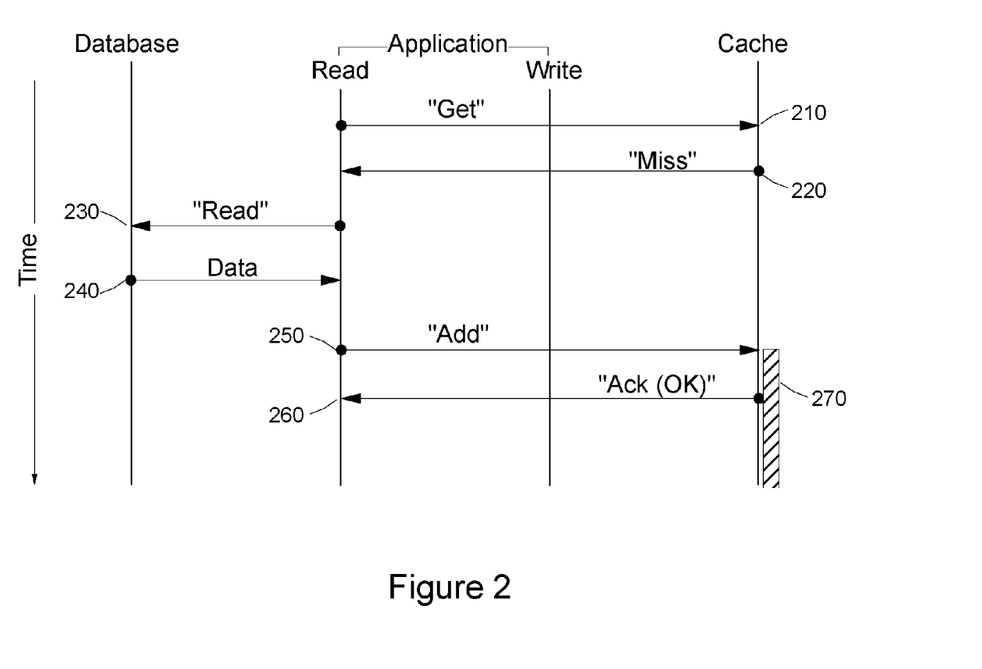
FIG. 2 illustrates the process that eventually permits to obtain in application a data requested by an end user and which is not yet present in cache.
Figure 3:
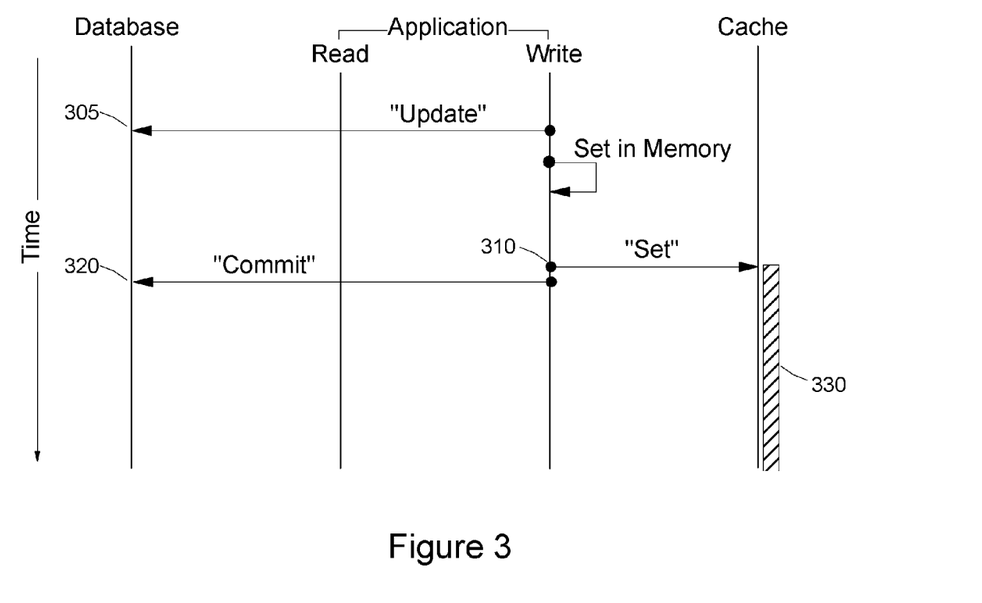
FIG. 3 describes the process of writing concurrently database and cache from the application.

FIGS. 2 and 3 show how cache is populated and maintained coherent with database contents under the sole control of the software application 10.

FIG. 2 describes the process that eventually permits to obtain in software application 10 a data requested by an end user and which is not yet present in cache. This situation mostly prevails when a cache is being populated, e.g., after a power-on of the system or because a new node has been inserted or removed and a rebalancing of the cache node 30 contents is in progress.

When software application 10 needs to answer a user request, cache is first read through a "Get" operation 210. In the example of an airline inventory database this is for example to answer one of the numerous user requests that are issued by end users of the database to find if seats are available in a particular flight on a certain date, in a certain class, etc. If the corresponding data is not present in cache, i.e., typically the corresponding data has not yet been brought in cache by a previous read, cache then returns a "Miss" 220 to the software application 10. Otherwise, the information is obviously just returned to the software application 10 from the cache which ends the "Get" operation. The software application 10 can thus fulfill the user request of the end-user. Eventually, it aggregates the queried data with additional data and returns it in response to the request from the end-user. Additional data are typically other data that may be necessarily retrieved to fulfill the user request. For instance, some data can be get from a cache node, while other data that are also necessary to fulfill the same user request must be get from other cache nodes and/or must be read from the database systems 20.

Upon receiving the information that queried data is not present in cache, the software application 10 interrogates the database with a "Read" operation 230. The missing information is then returned 240 to the software application 10. Reading of the data from the database occurs on the database dedicated interface 12 previously described. This is done by issuing, from the software application 10, the corresponding queries to the database management system (DBMS) used by the data storage system 100 of the invention.

Upon receiving from database the data missing in the cache the software application 10 then performs an "Add" operation 250 to store the data into the cache. From this time on, the data is present 270 in cache as long as cache stays operational and is not reconfigured. At completion of this operation a positive acknowledgement (OK) 260 is returned to the software application 10.

It is worth noting here that this process occurs only once while cache is up and running for any given pieces of data that are stored identically or consistently in database and in cache nodes 30. This occurs the first time the data is requested by software application 10 and is not yet present in cache. After which corresponding data is possibly updated if database contents needs to be changed, for example, because airline seats have been sold. In this case, as described hereafter, the software application 10 updates both the cache and the database so that it is never necessary to re-execute the process of FIG. 2.

FIG. 3 describes the process of updating concurrently database and cache from the software application 10.

To always keep coherent database and cache contents, the software application 10 always updates both cache and database. The updating of the cache is then done with a "Set" operation 310 previously described. Simultaneously, an "Update" 305 of the database is performed using the query language of the DBMS in use. The update is effective after the operation has been committed 320 to the database by the application.

More precisely, the Set is not done when the update is done in database but when the commit is done. The application keeps the data to be set in memory until the commit is done. There are possibly a high number of steps between the Update 305 and the Set 310. However, the Set 310 and the Commit 320 are intended to be performed in a row.

In steady state, i.e., after system has been up and running for a significant period of time, the whole contents of the database has eventually been brought and distributed over all cache nodes 30; then, the update operations, i.e., content updates, inserts and deletes are the only operations that need to be performed on the database interface thus much lowering the database load. The case of a delete operation that triggers a nullification of the corresponding data in cache is described in FIG. 7.

Also, it must be noted that cache of the invention is populated both from read and writes operations since the process of FIG. 3 does not assume that any particular conditions need to be fulfilled to write into the cache. This contributes significantly to expedite the population of the cache nodes 30 after a power-on as compared to systems where only reads are used to populate cache. This is possible and is thus simply done because, as already stated, data entities stored by database and cache are both kept updated which is not the case in other cache solutions where database and cache contents may be significantly different generally in an attempt to keep cache storage requirements minimum or when cache data entities delivered to the software application 10 are built from disjoint pieces of data extracted from various parts of the database.

Figure 4:
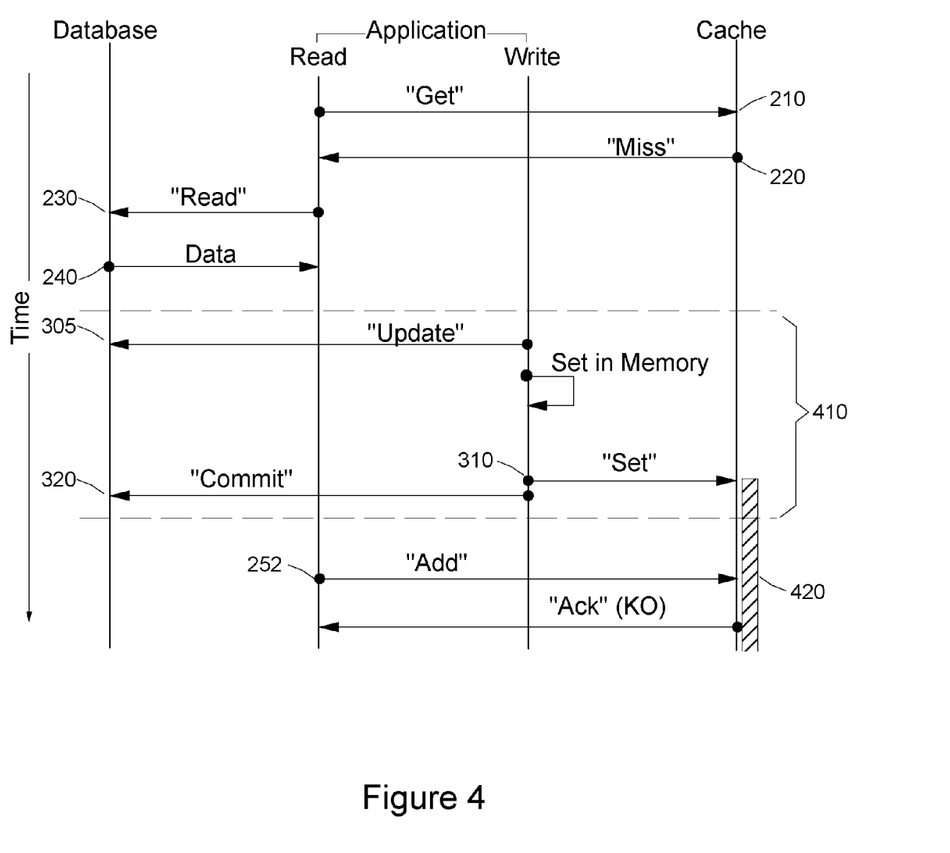
FIG. 4 illustrates the process of getting in cache data from the database in the particular case where a concurrent writing operation occurs.

FIG. 4 describes the process of FIG. 2 in the particular case where a concurrent writing (update for instance) of the database is requested by the software application 10 thus interfering with its execution.

In a manner identical to what was described in FIG. 2 the process starts with a "Get" 210 of data from the cache which is followed by a "Miss" 220 that triggers the fetching 230 of the missing data from the database. However, while missing data is normally returned 240 to the software application 10, a write query 410 for the same data is also received by the software application 10. The writing is performed as explained in FIG. 3. It is done in cache with a "Set" operation 310 and in database with an "Update" operation 305. The corresponding data becomes immediately available 420 when the "Set" is issued to the cache and, in database, when the "Commit" 320 is sent. Before the set is triggered, the application keeps the data in memory ("Set in memory").

Then, in this particular case, cache contents must not be further updated by the following "Add" 250 that results from the fetching 230 of the missing data from the database since this latter has been updated in the mean time. The "Add" 252 is then actually aborted. A negative acknowledgement (KO) 262 is returned which let know the software application 10 that the update of the cache has not been actually performed by the "Add" operation.

Thus, for updating the cache with the data read in the database, the invention uses the add command so that we can send data to the cache without having to lock the data in database. Indeed, if the data is still not in the cache when trying to add it, it will effectively be added. If it has been updated in the meanwhile by an update process, the add will fail but this is expected: the update process had the lock on the database and so the primacy on the update for this key, hence it is normal this is the one that stays in the cache.

These features of the invention allow a very smooth integration with the update process, in particular since database system and cache cannot lock or impact the performance of each others, while still ensuring a data is never read more than once in the database, thus having the lowest possible load on the database.

Figure 5:
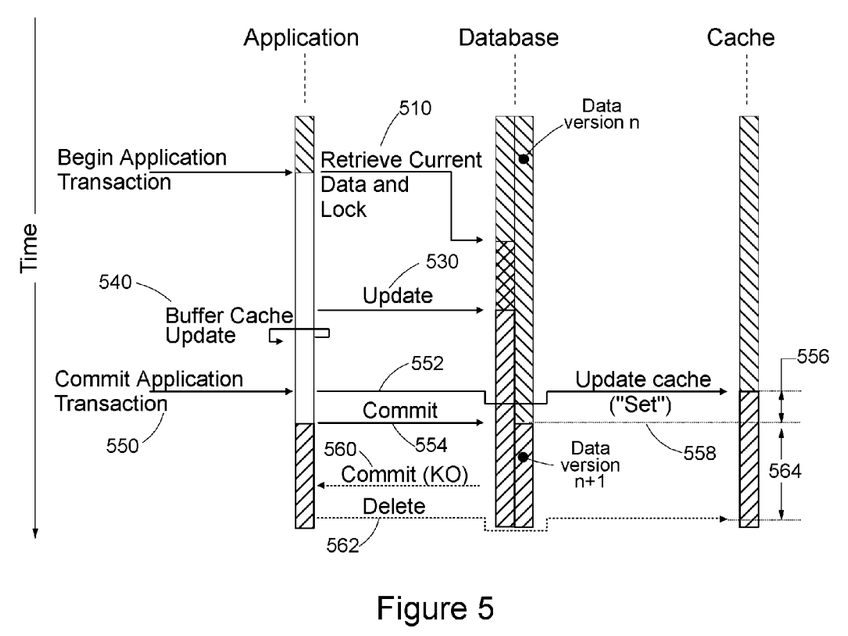
FIG. 5 gives further details on the timing of the data writing performed simultaneously by the application in database and in cache.

FIG. 5 gives further details on the timing of the data updates performed simultaneously by software application 10 in database and in cache.

The software application 10 begins the update transaction by issuing the corresponding queries 510 to the database to retrieve the current stored values. Simultaneously, to prevent concurrent updates to occur from another software application 10, the database management system (DBMS) locks the current stored values. Within software application tier, data are processed by software application 10. When data are ready to be updated 530 by DBMS an update of a buffer cache 540 in software application 10 is also performed that holds the new data to be forwarded and stored in cache.

Then, software application 10 can commit the change 550 which is immediately performed in cache 552 with a "Set" operation and also committed to database 554. One may notice that the new data is thus available in cache slightly prior 556 it is indeed committed and available 558 in database. Reference 556 shows the timeframe during which the update is made available to end users in cache while it is not yet available in the database system 20.

If, for any reason, e.g., because of a hardware and/or software failure, commitment fails to complete normally the previous writing operation in cache, i.e., the "Set" operation 552, is rolled back so that cache contents is left unchanged. Hence, if commit fails, a "commit KO" 560 is raised to the application which then issues a delete 562 towards the cache to remove the added data. As a result, a wrong value is then present in the cache in the mean time 564.

Thus the highest performance non database related and impacting data quality is provided to the cache: updates are propagated to the cache using a write ahead commit with "asked for commit" data. If deferred constraints are banned for the cached data, this makes the data in the cache "at worse" in advance compared to the database but without any extra cost, in particular without the very high cost of the usual two phases commit architectures. Such quality fulfils the data quality requirements for the availability requests and can even be considered as an advantage from the final client perspective.

Figure 6:
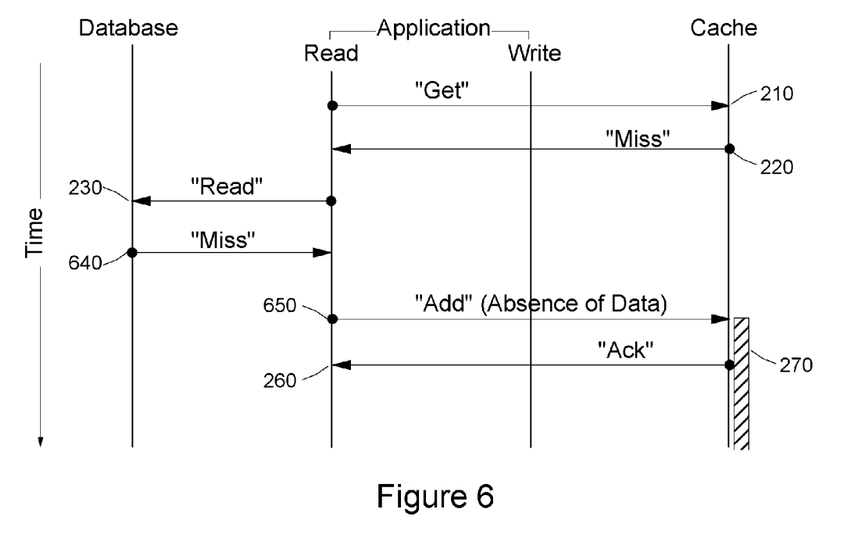
FIG. 6 illustrates the case where requested data is neither present in cache nor in database.

FIG. 6 describes the case where queried data is neither present in cache nor in database. This covers the cases where end-users are requesting pieces of information that are not held in database.

When such a situation occurs, to prevent further interrogations of the database, the absence of corresponding data is also recorded into the cache. Then, next time the cache is interrogated from the software application 10 the information that the queried data is not present in database is directly delivered by the cache itself thus further reducing the database load.

The process is similar to the one described in FIG. 2. After a "Get" operation 210 issued to cache has returned a "Miss" 220, reading 230 of the corresponding data in the database also returns to the software application 10 a database "Miss" 640. Then, the absence of data is added 650 into the cache. Like with data, the absence of data is becoming available immediately 270 in cache which also returns an acknowledgment 260 to the software application 10.

According to a non limitative embodiment, each data is associated with a header to form a record and the header indicates whether the content is missing in the database system 20. Thus, reading only the header of the record enables to know whether it is worth fetching the database system. According to an alternative embodiment, the cache node stores a specific value associated to the data, said specific value indicating that the data is not present in the database. Thus, reading only the value of the record enables to know whether it is worth fetching the database system.

Figure 7:
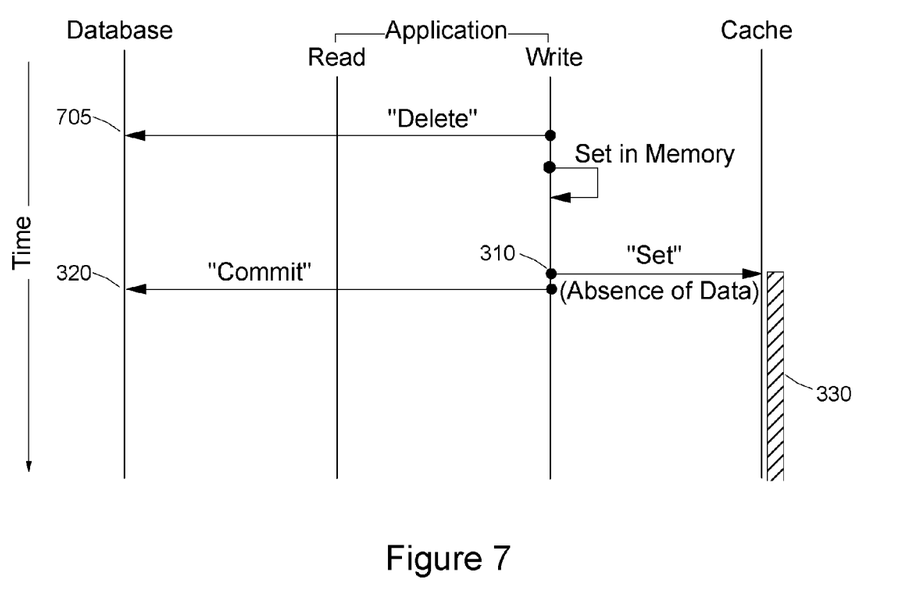
FIG. 7 illustrates the case where a writing of the database and cache is a delete.

FIG. 7 illustrates the case already mentioned in FIG. 3 where the specific update operation from the application is a delete 705 of data from the database. This operation is overall performed as explained in FIG. 3 except that deleted data is not actually removed from the cache but replaced by the indication of an "absence of data". When delete is committed 320 to the database by the application the corresponding information is stored in cache with a specific "SET" operation 310. The "absence of data" is becoming immediately available 330. Hence, as previously discussed, if cache is later interrogated it can provide directly the information that the requested data is no longer neither present in cache nor in database.

The following discusses the case where it becomes necessary to modify the configuration of the database system of the invention, e.g., to cope with a traffic increase. Extra cache nodes must be added to expand the system configuration as shown in FIG. 1 in order to provide more cache storage capacity and to be able to distribute the increasing traffic over a larger number of processing nodes. However, with a larger number of nodes, and generally speaking whenever the number of active nodes must be changed, the keys that uniquely address data in nodes must be recomputed to indeed allow the whole traffic to be evenly spread over the new complete set of nodes.

The invention does not assume any particular way of computing keys from the data entities that are stored and retrieved identically from database and cache. Most of the time, depending on the type of data to be handled by a particular application, some hashing function is used and the node addressing is then just derived from the hashed key by further computing it modulo the number of nodes. Hence, if the number of nodes is changed, a different result is obtained for retrieving a particular data entity that possibly needs to be looked for in a different node of the new configuration. The problem comes from the fact that a configuration update is not atomic and must be transparently performed while database system is fully operational. Not all cache clients are made aware of the new configuration at the same time. This means that some writes of data would be done on the basis of the new configuration while others could still use the old configuration. The result would be an inconsistent set of data between cache and database.

The invention takes care of this by enabling a procedure called "dual-feed". Dual feeding consists in maintaining one extra configuration in addition to the one normally used for the cache, hence the name of "dual-feed". The extra configuration is not used by default but can be activated for the time of the configuration change. When it is activated, all write operations are sent both to the standard configuration and to the dual-feed configuration. A time-to-live (TTL) is a property associated to each item in the cache. As the name suggests, it corresponds to the period of time item is valid. Once it expires, the item can no longer be retrieved from the cache, resulting in a cache miss as if the data was missing. This can be set by configuration: one for the standard configuration and one for the dual-feed configuration. When no time to live is set, the item never expires.

As the activation of dual-feed configuration is not atomic either, it must be activated in a first place with a short time to live. Once the dual feed configuration is fully activated, the time to live can be removed. It is only once the time to live has expired that the standard configuration and the dual-feed configuration can be swapped. Once the configuration change is over, the dual-feed can be deactivated. During the steps where the configuration is being propagated (activation/deactivation of dual-feed), some "invalid" data can be written but only in places where they are not read. Thus, the procedure is as follows:

creation of dual-feed configuration with short TTL
    activation of the dual-feed configuration, wait for its propagation
    removing of the short TTL from dual-feed configuration
    swapping of standard and dual-feed configurations, waiting for their propagation
    deactivation of the dual-feed A set of procedure to allow any change on the system in an online way is described below.

The proposed architecture offers such scalability that the whole system may not be later in a position to work properly without the cache. To deal with such situation, according to an embodiment of the invention, it is proposed that all maintenance operations are meant to be done online, impacting at most one node (or the equivalent proportion of the traffic) at a time (eg. cache node upgrade or replacement made one by one, global cache changes performed using a dual feed mechanism) to lower the impact on the database.

cache node upgrade or replacement are made one by one. The system will preferably use the database to retrieve the data that should have been hosted by this node.
    global cache changes, typically, adding or removing or changing a plurality of cache nodes, that would result in the global distribution to be dramatically changed are performed using a dual feed mechanism as described in previous paragraph.

The program code embodying the software program instructions of various exemplary embodiments described herein is capable of being distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media include wired media such as a wired network or direct-wired connection, and wireless media such as acoustic, RF, infrared and other wireless media. Combinations of any of the above may also be included within the scope of computer readable media.

From the above description it appears clearly that the present invention allows keeping data consistent between the cache and the database thanks to a mechanism which is non-strictly speaking ACID compliant but highly scalable, impactless on the database, allowing 100% hit ratio and, above all, fully meeting data quality needs. In addition, the invention allows to cache highly dynamic data i.e., typically up to several tens writings per second per unitary data, while still benefiting from the off-load effect of the cache.

The invention claimed is:

1. A method of storing and retrieving data in a data storage system, wherein the data storage system comprises at least one computer including at least one data processor and a software application that implements a middle tier, the data storage system further comprises one or more database systems and a plurality of cache nodes that implement a storage tier, the middle tier is configured to interface the storage tier of the data storage system with a client tier, the method comprising:

at the at least one computer of the middle tier:
    in response to receiving a first user request from a user device of the client tier requiring at least one reading of data, sending a read query solely to the plurality of cache nodes;
    in response to receiving a first queried data from at least one cache node in response to the read query, processing, with the at least one data processor, the first user request using the first queried data;
    in response to receiving a miss from all cache nodes in response to the read query, fetching, with the at least one data processor, the one or more database systems based on the first user request;
    in response to retrieving a second queried data from the one or more database systems, processing the first user request using the second queried data from the one or more database systems and sending, to the at least one cache node the second queried data and an instruction to add the second queried data to the at least one cache node to thereby populate the at least one cache node with the second queried data from the one or more database systems in response to the missed read query; and
    in response to receiving a second user request requiring at least one writing of updated data concurrent with fetching the second queried data from the one or more database systems, sending an instruction for writing the one or more database systems with the updated data, sending an instruction for concurrently writing the at least one cache node with the updated data to thereby populate the plurality of cache nodes at each write query of the data storage system, and aborting a subsequent addition of the second queried data in the at least one cache node such that the updated data is stored in the plurality of cache nodes.

2. The method of claim 1, wherein the second user request comprises at least one of: addition, update, and deletion of data in the database systems.

3. The method of claim 1, further comprising;
    receiving a positive acknowledgement on completion of a successful addition of the queried data from the one or more database systems to the at least one cache node.

4. The method of claim 1, wherein the at least one computer of the middle tier interfaces independently with the one or more database systems on a first dedicated interface, and the least one computer of the middle tier interfaces with the plurality of cache nodes on a second dedicated interface.

5. The method of claim 1, wherein a data model of the plurality of cache nodes and a data model of the one or more databases are consistent such that common addressing keys can be derived for accessing cache nodes and database data.

6. The method of claim 1, wherein the at least one computer of the middle tier is an inventory system of a travel provider.

7. The method of claim 1, wherein the first user request is sent by at least one of: travel agency, online travel agency, and online-customer.

8. The method of claim 1, further comprising:
in response to sending an instruction for the writing of data in the one or more database systems and an instruction for concurrently writing the at least one cache node:
retrieving from the one or more database systems a currently stored data on which the writing applies and locking said currently stored data;
writing in the one or more database systems new data to be stored;
writing in a cache buffer of the at least one computer of the middle tier to temporarily hold said new data to be stored;
forwarding to and setting into the at least one cache node said new data to be stored; and
committing the transaction to the one or more database systems.

9. The method of claim 8, further comprising:
in response to failing to commit, deleting the new data in the at least one cache node.

10. The method of claim 1, further comprising:
determining the at least one cache node from among the plurality of cache nodes to which the instruction to add the second queried data or the instruction for writing the at least one cache node with the updated data is sent.

11. The method of claim 10, wherein the at least one cache node from among the plurality is determined based on a load balancing.

12. The method of claim 1, further comprising:
in response to the one or more database systems returning a miss associated with requested data of the first user request, sending to the at least one cache node a data of absence for addition to the at least one cache node corresponding to the first user request, such that the data of absence is immediately available for all subsequent read queries to thereby avoid subsequent fetching of the one or more databases to retrieve the requested data of the first user request.

13. The method of claim 1, wherein each of the plurality of cache nodes stores a record comprising a header, and the header of the at least one cache node indicates that the requested data is missing in the at least one database system or the value of the requested data is set to a value indicating the absence of the requested data.

14. The method of claim 1, wherein records of the plurality of cache nodes and records of the one or more database systems are stored such that related records of the plurality of cache nodes and the one or more database systems are consistently addressed.

15. The method of claim 14, wherein keys associated with the records allow the records stored in the one or more database systems to be locked.

16. The method of claim 14, wherein each record of the plurality of cache nodes and each record of the one or more database systems is grouped by functional entity and indexed by a key which makes the record immediately accessible in the one or more database systems and in the plurality of cache nodes.

17. The method of claim 16, wherein each functional entity is a flight-date and each key is a flight-date key.

18. A method of storing and retrieving data in a data storage system, wherein the data storage system comprises at least one computer including at least one data processor and a software application that implements a middle tier, the data storage system further comprises one or more database systems and a plurality of cache nodes that implement a storage tier, the middle tier is configured to interface the storage tier of the data storage system with a client tier, the method comprising:
at the at least one computer of the middle tier and in response to receiving a first user request requiring a reading of data sending a read query solely to the plurality of cache nodes;
in response to receiving a first queried data from at least one cache node in response to the read query, processing the user request with the first queried data;
in response to receiving a miss from all cache nodes in response to the read query, fetching the one or more database systems based on the first user request;
in response to retrieving a second queried data from the one or more database systems processing the first user request and sending to the plurality of cache nodes the second queried data and an instruction to add the second queried data to the plurality of cache nodes to thereby populate the plurality of cache nodes with the second queried data from the one or more database systems in response to the missed read query; and
in response to receiving a miss from all cache nodes in response to the read query and the one or more database systems returning a miss associated with requested data of the first user request, adding, in the plurality of cache nodes, data of absence that indicates that the requested data of the first user request is not stored in the one or more database systems of the data storage system such that subsequent fetching of the one or more databases to retrieve the requested data for the first user request is avoided.

19. The method of claim 18, wherein the data storage system is an airline inventory system, the one or more database systems store availability for flights managed by the airline inventory system, the plurality of cache nodes store availability for flights managed by the airline inventory system, and wherein the first user request is for an availability regarding at least one flight managed by the airline inventory system.

20. The method of claim 19, further comprising:
in response to receiving a second user request requiring a writing to modify an availability regarding at least one flight, sending an instruction for writing the one or more database systems and also sending an instruction for concurrently writing the plurality of cache nodes to thereby populate the plurality of cache nodes in response to each write query of the data storage system.

21. The method of claim 20, wherein the second user request corresponds to at least one of: purchasing a seat, canceling a seat, modifying a seat.

22. A data storage system comprising:
one or more database systems;
a plurality of cache nodes;
at least one data processor; and
a memory storing a software application, where execution of the software application by the at least one data processor causes the at least one processor to:

in response to receiving a first user request from a user device, send a read query to the plurality of cache nodes;

in response to receiving a first queried data from the plurality of cache nodes in response to the read query, process the first user request using the first queried data;

in response to receiving a miss from the plurality of cache nodes in response to the read query, fetch the one or more database systems based on the first user request;

in response to retrieving a second queried data from the one or more database systems, process the first user request using the second queried data and send, to the plurality of cache nodes, the second queried data and an instruction to add the second queried data to the plurality of cache nodes to thereby populate the plurality of cache nodes with the second queried data from the one or more database systems responsive to the missed read query; and in response to receiving a second user request requiring at least one writing of updated data concurrent with fetching the second queried data from the one or more database systems, send an instruction for writing the one or more database systems with the updated data and send an instruction for concurrently writing the plurality of cache nodes with the updated data to thereby populate the plurality of cache nodes at each write query of the data storage system, and aborting a subsequent addition of the second queried data in the plurality of cache nodes such that the updated data is stored in the plurality of cache nodes.

23. The data storage system of claim 22, wherein the number of cache nodes is adapted to hold all contents of the database system.

24. The data storage system of claim 22, wherein some data of the database system are stored in more than one cache node.

25. The data storage system of claim 22, wherein the data storage system corresponds to an inventory system of a travel provider.

* * * * *